United States Patent
Malheiros et al.

(10) Patent No.: US 9,394,643 B2
(45) Date of Patent: Jul. 19, 2016

(54) DYNAMIC BALANCER IN A LAUNDRY TREATING APPLIANCE

(71) Applicant: Whirlpool Corporation, Benton Harbor, MI (US)

(72) Inventors: George W. Malheiros, Saint Joseph, MI (US); Richard V. Oney, Bridgman, MI (US); Scott T. Thalls, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 119 days.

(21) Appl. No.: 14/029,933

(22) Filed: Sep. 18, 2013

(65) Prior Publication Data

US 2015/0075229 A1    Mar. 19, 2015

(51) Int. Cl.
| | |
|---|---|
| *D06F 37/24* | (2006.01) |
| *D06F 33/02* | (2006.01) |
| *D06F 37/22* | (2006.01) |
| *F16F 15/14* | (2006.01) |

(52) U.S. Cl.
CPC ............ *D06F 37/225* (2013.01); *D06F 37/245* (2013.01); *F16F 15/1485* (2013.01); *D06F 33/02* (2013.01); *Y10T 74/2128* (2015.01)

(58) Field of Classification Search
CPC ..... D06F 37/225; D06F 37/203; D06F 37/20; D06F 37/22; F16F 15/13446; F16F 15/1485; F16F 15/12333; F06F 37/206
See application file for complete search history.

(56) References Cited

U.S. PATENT DOCUMENTS

| | | | | |
|---|---|---|---|---|
| 2,584,227 | A | * | 2/1952 | Potter ........................ 384/482 |
| 5,782,110 | A | * | 7/1998 | Kim .............................. 68/23.3 |
| 5,916,274 | A | | 6/1999 | Lee et al. |
| 6,442,782 | B1 | | 9/2002 | Vande Haar |
| 6,550,292 | B1 | | 4/2003 | Southworth et al. |
| 6,658,902 | B2 | | 12/2003 | Southworth et al. |
| 7,743,633 | B2 | | 6/2010 | Ryu et al. |
| 8,297,083 | B2 | | 10/2012 | Kim et al. |
| 8,438,881 | B2 | | 5/2013 | Ihne et al. |
| 2007/0283727 | A1 | | 12/2007 | Kim et al. |
| 2010/0000022 | A1 | | 1/2010 | Hendrickson et al. |
| 2010/0000024 | A1 | | 1/2010 | Hendrickson et al. |
| 2010/0000264 | A1 | | 1/2010 | Luckman et al. |
| 2010/0000573 | A1 | | 1/2010 | Hendrickson et al. |
| 2010/0000581 | A1 | | 1/2010 | Doyle et al. |
| 2010/0000586 | A1 | | 1/2010 | Hendrickson |

FOREIGN PATENT DOCUMENTS

EP            0997568 B1        8/2003

* cited by examiner

*Primary Examiner* — Michael Barr
*Assistant Examiner* — Rita Adhlakha

(57) ABSTRACT

A dynamic balancer device for a laundry treating appliance includes, among other things, a first raceway piece having an L-shaped cross section defining a first annular channel and a second raceway piece having an L-shaped cross section defining a second annular channel. The first raceway piece is attached to the second raceway piece with the first annular channel facing the second annular channel to define a raceway. The dynamic balancer device also includes a mass disposed in the annular raceway and movable therein.

20 Claims, 5 Drawing Sheets

DYNAMIC BALANCER IN A LAUNDRY TREATING APPLIANCE

BACKGROUND OF THE INVENTION

Laundry treating appliances, such as a washing machine, may implement cycles of operation in which a drum defining a treating chamber for receiving a laundry load is rotated at high speeds, such as a spin or water extraction phase. For example, to extract the water from the laundry load, the drum is typically spun at high speeds. If a sufficiently large enough load imbalance is present, the laundry treating appliance may experience undesirable vibrations and movements when the drum is rotated at high speeds during the spin phase.

SUMMARY OF THE INVENTION

In one aspect, the invention is a dynamic balancer device for a laundry treating appliance including a rotatable drum for receiving a laundry load. In one embodiment, the dynamic balancer device comprises a first raceway piece having an L-shaped cross section defining a first annular channel; a second raceway piece having an L-shaped cross section defining a second annular channel wherein the first raceway piece is attached to the second raceway piece with the first annular channel facing the second annular channel to define an annular raceway with each of the first and second annular channels respectively defining two walls of the annular raceway. The dynamic balancer device further comprises a mass disposed in the raceway and movable therein.

In another aspect, the invention relates to a laundry treating appliance that includes a rotatable drum for receiving a laundry load wherein the rotatable drum has an annular wall at one end thereof. A dynamic balancer device is disposed adjacent to the annular wall and includes a first raceway piece having an L-shaped cross section that defines a first annular channel and a second raceway piece having an L-shaped cross section that defines a second annular channel. The first raceway piece is attached to the second raceway piece with the first annular channel facing the second annular channel to define an annular raceway with each of the first and second annular channels respectively defining two walls of the annular raceway, and a mass is disposed in the raceway and movable therein.

DESCRIPTION OF EMBODIMENTS OF THE INVENTION

Figure 1:
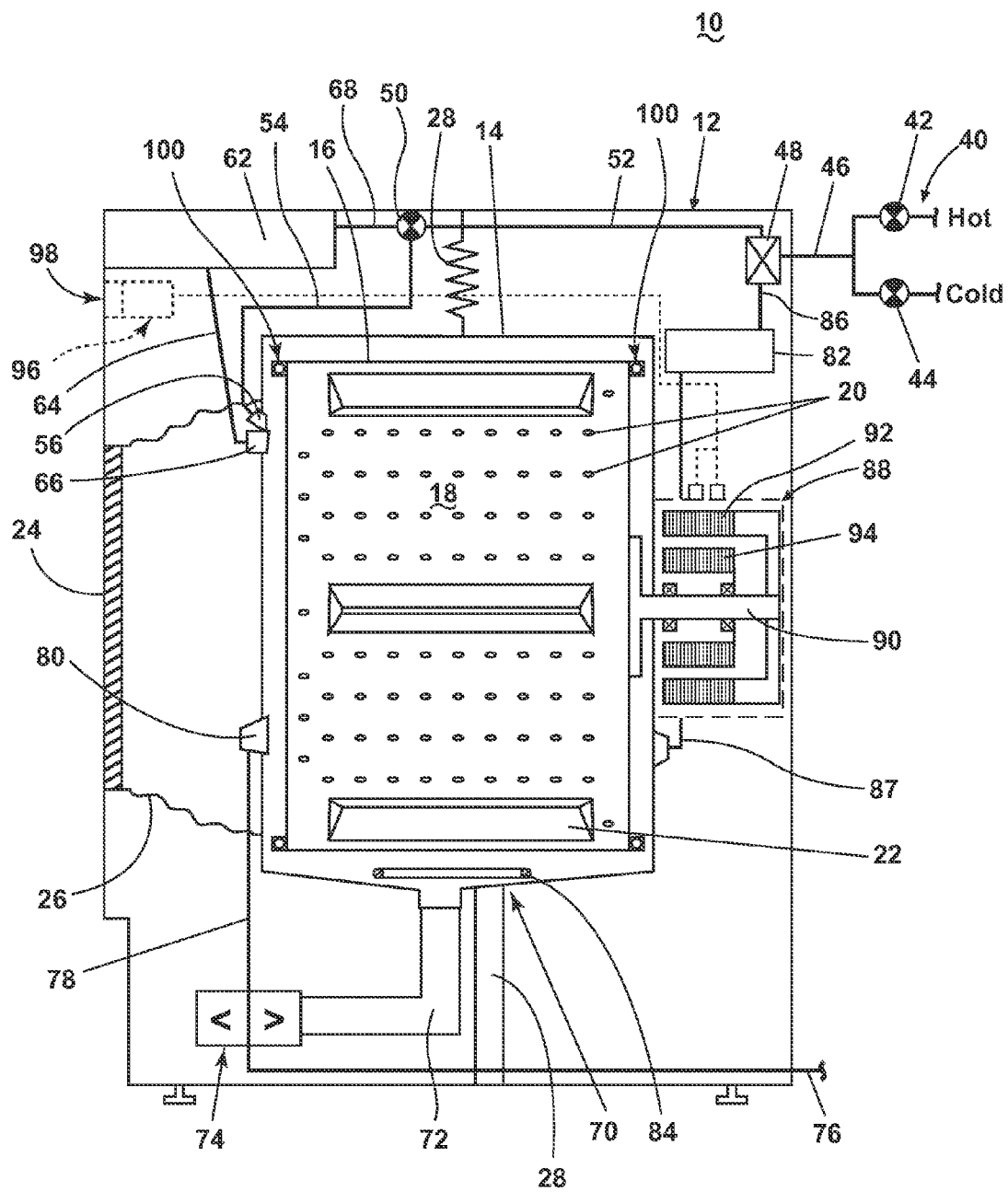
FIG. 1 is a schematic view of a laundry treating appliance in the form of a washing machine according to an embodiment of the invention.

FIG. 1 is a schematic view of a laundry treating appliance according to a first embodiment of the invention. The laundry treating appliance may be any appliance which performs a cycle of operation to clean or otherwise treat items placed therein, non-limiting examples of which include a horizontal or vertical axis clothes washer; a combination washing machine and dryer; a tumbling or stationary refreshing/revitalizing machine; an extractor; a non-aqueous washing apparatus; and a revitalizing machine.

The laundry treating appliance of FIG. 1 is illustrated as a washing machine 10, which may include a structural support system comprising a cabinet 12 which defines a housing within which a laundry holding system resides. The cabinet 12 may be a housing having a chassis and/or a frame, defining an interior that encloses components typically found in a conventional washing machine, such as motors, pumps, fluid lines, controls, sensors, transducers, and the like. Such components will not be described further herein except as necessary for a complete understanding of the invention.

The laundry holding system comprises a tub 14 supported within the cabinet 12 by a suitable suspension system and a drum 16 provided within the tub 14, the drum 16 defining at least a portion of a laundry treating chamber 18. The drum 16 may include a plurality of perforations 20 such that liquid may flow between the tub 14 and the drum 16 through the perforations 20. A plurality of baffles 22 may be disposed on an inner surface of the drum 16 to lift the laundry load received in the treating chamber 18 while the drum 16 rotates. It is also within the scope of the invention for the laundry holding system to comprise only a tub with the tub defining the laundry treating chamber.

The laundry holding system may further include a door 24 which may be movably mounted to the cabinet 12 to selectively close both the tub 14 and the drum 16. A bellows 26 may couple an open face of the tub 14 with the cabinet 12, with the door 24 sealing against the bellows 26 when the door 24 closes the tub 14.

The washing machine 10 may further include a suspension system 28 for dynamically suspending the laundry holding system within the structural support system.

The washing machine 10 may further include a liquid supply system for supplying water to the washing machine 10 for use in treating laundry during a cycle of operation. The liquid supply system may include a source of water, such as a household water supply 40, which may include separate valves 42 and 44 for controlling the flow of hot and cold water, respectively. Water may be supplied through an inlet conduit 46 directly to the tub 14 by controlling first and second diverter mechanisms 48 and 50, respectively. The diverter mechanisms 48, 50 may be a diverter valve having two outlets such that the diverter mechanisms 48, 50 may selectively direct a flow of liquid to one or both of two flow paths. Water from the household water supply 40 may flow through the inlet conduit 46 to the first diverter mechanism 48 which may direct the flow of liquid to a supply conduit 52. The second diverter mechanism 50 on the supply conduit 52 may direct the flow of liquid to a tub outlet conduit 54 which may be provided with a spray nozzle 56 configured to spray the flow of liquid into the tub 14. In this manner, water from the household water supply 40 may be supplied directly to the tub 14.

The washing machine 10 may also be provided with a dispensing system for dispensing treating chemistry to the treating chamber 18 for use in treating the laundry according to a cycle of operation. The dispensing system may include a dispenser 62 which may be a single use dispenser, a bulk dispenser or a combination of a single use and a bulk dispenser. Non-limiting examples of suitable dispensers are disclosed in U.S. Pub. No. 2010/0000022 to Hendrickson et al., filed Jul. 1, 2008, entitled "Household Cleaning Appliance with a Dispensing System Operable Between a Single Use Dispensing System and a Bulk Dispensing System," U.S. Pub. No. 2010/0000024 to Hendrickson et al., filed Jul. 1, 2008, entitled "Apparatus and Method for Controlling Laundering Cycle by Sensing Wash Aid Concentration," U.S. Pub. No. 2010/0000573 to Hendrickson et al., filed Jul. 1, 2008, entitled "Apparatus and Method for Controlling Concentration of Wash Aid in Wash Liquid," U.S. Pub. No. 2010/0000581 to Doyle et al., filed Jul. 1, 2008, entitled "Water Flow Paths in a Household Cleaning Appliance with Single Use and Bulk Dispensing," U.S. Pub. No. 2010/0000264 to Luckman et al., filed Jul. 1, 2008, entitled "Method for Converting a Household Cleaning Appliance with a Non-Bulk Dispensing System to a Household Cleaning Appliance with a Bulk Dispensing System," U.S. Pub. No. 2010/0000586 to Hendrickson, filed Jun. 23, 2009, entitled "Household Cleaning Appliance with a Single Water Flow Path for Both Non-Bulk and Bulk Dispensing," and application Ser. No. 13/093,132, filed Apr. 25, 2011, entitled "Method and Apparatus for Dispensing Treating Chemistry in a Laundry Treating Appliance," which are herein incorporated by reference in full.

Regardless of the type of dispenser used, the dispenser 62 may be configured to dispense a treating chemistry directly to the tub 14 or mixed with water from the liquid supply system through a dispensing outlet conduit 64. The dispensing outlet conduit 64 may include a dispensing nozzle 66 configured to dispense the treating chemistry into the tub 14 in a desired pattern and under a desired amount of pressure. For example, the dispensing nozzle 66 may be configured to dispense a flow or stream of treating chemistry into the tub 14 by gravity, i.e. a non-pressurized stream. Water may be supplied to the dispenser 62 from the supply conduit 52 by directing the diverter mechanism 50 to direct the flow of water to a dispensing supply conduit 68.

Non-limiting examples of treating chemistries that may be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

The washing machine 10 may also include a recirculation and drain system for recirculating liquid within the laundry holding system and draining liquid from the washing machine 10. Liquid supplied to the tub 14 through tub outlet conduit 54 and/or the dispensing supply conduit 68 typically enters a space between the tub 14 and the drum 16 and may flow by gravity to a sump 70 formed in part by a lower portion of the tub 14. The sump 70 may also be formed by a sump conduit 72 that may fluidly couple the lower portion of the tub 14 to a pump 74. The pump 74 may direct liquid to a drain conduit 76, which may drain the liquid from the washing machine 10, or to a recirculation conduit 78, which may terminate at a recirculation inlet 80. The recirculation inlet 80 may direct the liquid from the recirculation conduit 78 into the drum 16. The recirculation inlet 80 may introduce the liquid into the drum 16 in any suitable manner, such as by spraying, dripping, or providing a steady flow of liquid. In this manner, liquid provided to the tub 14, with or without treating chemistry may be recirculated into the treating chamber 18 for treating the laundry within.

The liquid supply and/or recirculation and drain system may be provided with a heating system which may include one or more devices for heating laundry and/or liquid supplied to the tub 14, such as a steam generator 82 and/or a sump heater 84. Liquid from the household water supply 40 may be provided to the steam generator 82 through the inlet conduit 46 by controlling the first diverter mechanism 48 to direct the flow of liquid to a steam supply conduit 86. Steam generated by the steam generator 82 may be supplied to the tub 14 through a steam outlet conduit 87. The steam generator 82 may be any suitable type of steam generator such as a flow through steam generator or a tank-type steam generator. Alternatively, the sump heater 84 may be used to generate steam in place of or in addition to the steam generator 82. In addition or alternatively to generating steam, the steam generator 82 and/or sump heater 84 may be used to heat the laundry and/or liquid within the tub 14 as part of a cycle of operation.

Additionally, the liquid supply and recirculation and drain system may differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 also includes a drive system for rotating the drum 16 within the tub 14. The drive system may include a motor 88, which may be directly coupled with the drum 16 through a drive shaft 90 to rotate the drum 16 about a rotational axis during a cycle of operation. The motor 88 may be a brushless permanent magnet (BPM) motor having a stator 92 and a rotor 94. Alternately, the motor 88 may be coupled to the drum 16 through a belt and a drive shaft to rotate the drum 16, as is known in the art. Other motors, such as an induction motor or a permanent split capacitor (PSC) motor, may also be used. The motor 88 may rotate the drum 16 at various speeds in either rotational direction.

The washing machine 10 also includes a control system for controlling the operation of the washing machine 10 to implement one or more cycles of operation. The control system may include a controller 96 located within the cabinet 12 and a user interface 98 that is operably coupled with the controller 96. The user interface 98 may include one or more knobs, dials, switches, displays, touch screens and the like for communicating with the user, such as to receive input and provide output. The user may enter different types of information including, without limitation, cycle selection and cycle parameters, such as cycle options.

The controller 96 may include the machine controller and any additional controllers provided for controlling any of the components of the washing machine 10. For example, the controller 96 may include the machine controller and a motor controller. Many known types of controllers may be used for the controller 96. The specific type of controller is not germane to the invention. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), may be used to control the various components.

Figure 2:
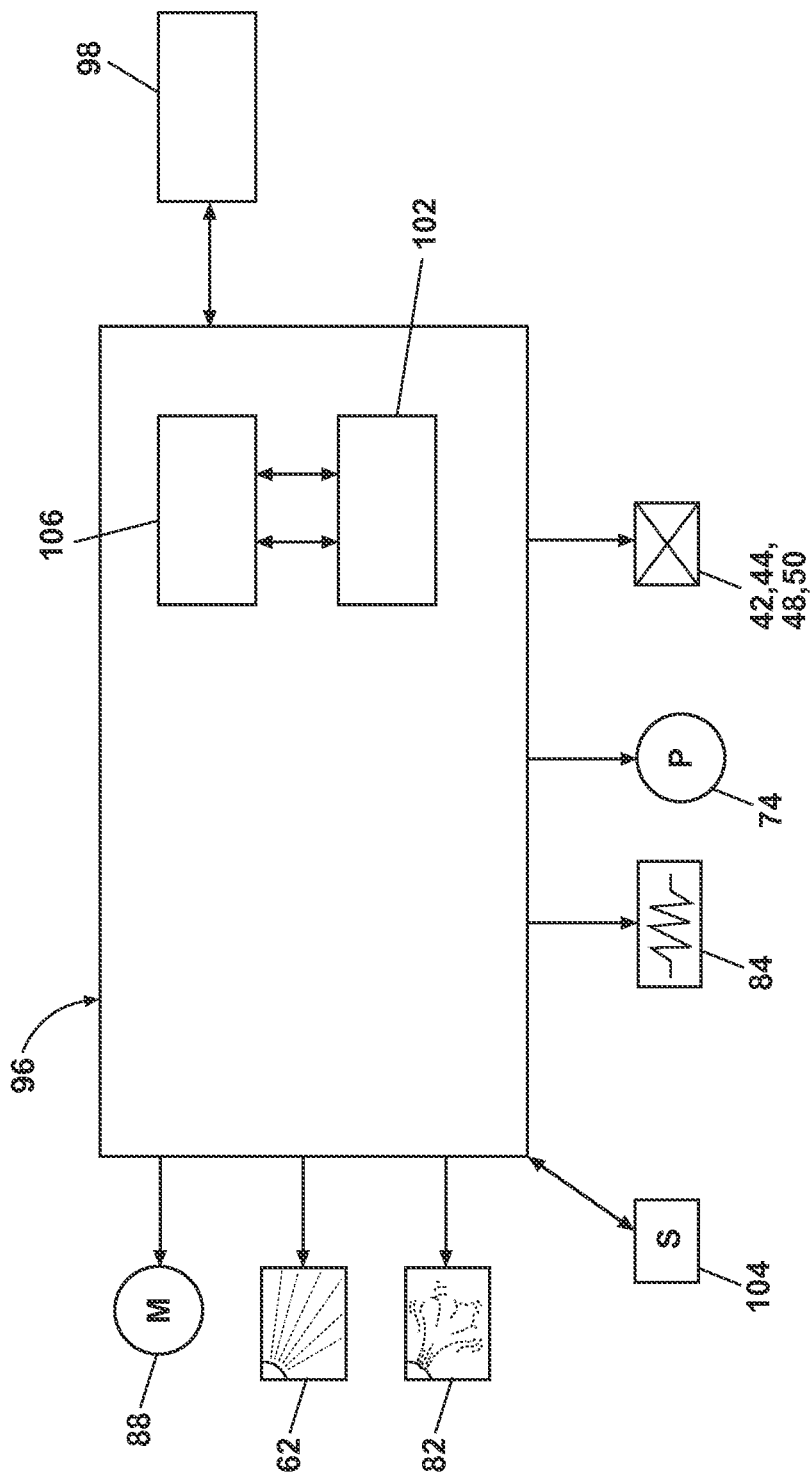
FIG. 2 is a schematic of a control system of the laundry treating appliance of FIG. 1 according to an embodiment of the invention.

As illustrated in FIG. 2, the controller 96 may be provided with a memory 106 and a central processing unit (CPU) 102. The memory 106 may be used for storing the control software that is executed by the CPU 102 in completing a cycle of operation using the washing machine 10 and any additional software. Examples, without limitation, of cycles of operation include: wash, heavy duty wash, delicate wash, quick wash, pre-wash, refresh, rinse only, and timed wash. The memory 106 may also be used to store information, such as a database or table, and to store data received from one or more components of the washing machine 10 that may be communicably coupled with the controller 96. The database or table may be used to store the various operating parameters for the one or more cycles of operation, including factory default values for the operating parameters and any adjustments to them by the control system or by user input.

The controller 96 may be operably coupled with one or more components of the washing machine 10 for communicating with and controlling the operation of the component to complete a cycle of operation. For example, the controller 96 may be operably coupled with the motor 88, the pump 74, the dispenser 62, the steam generator 82 and the sump heater 84 to control the operation of these and other components to implement one or more of the cycles of operation.

The controller 96 may also be coupled with one or more sensors 104 provided in one or more of the systems of the washing machine 10 to receive input from the sensors, which are known in the art and not shown for simplicity. Non-limiting examples of sensors 104 that may be communicably coupled with the controller 96 include: a treating chamber temperature sensor, a moisture sensor, a weight sensor, a chemical sensor, a position sensor and a motor torque sensor, which may be used to determine a variety of system and laundry characteristics, such as laundry load inertia or mass.

Figure 3:
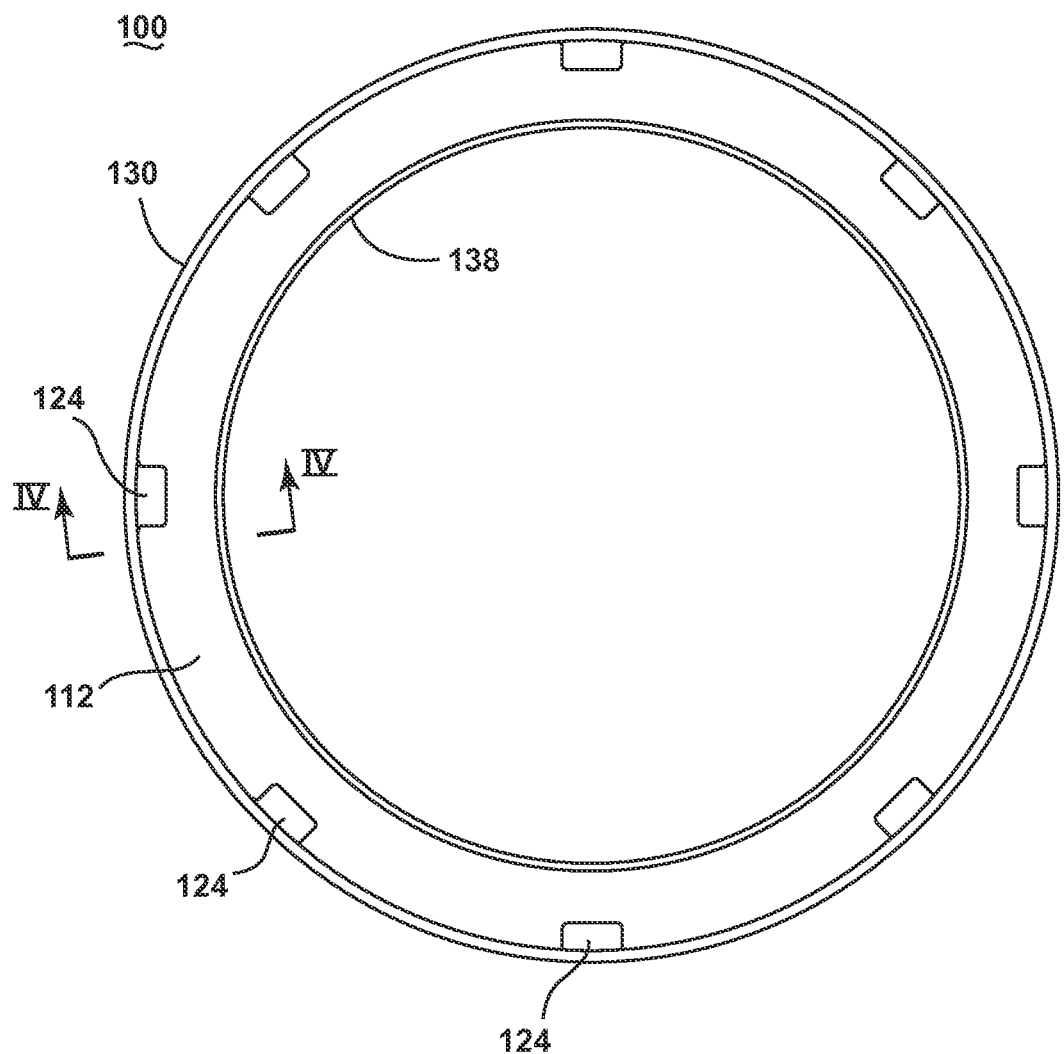
FIG. 3 is a view of a balancer device constructed in accordance with an embodiment of the invention.
Figure 4:
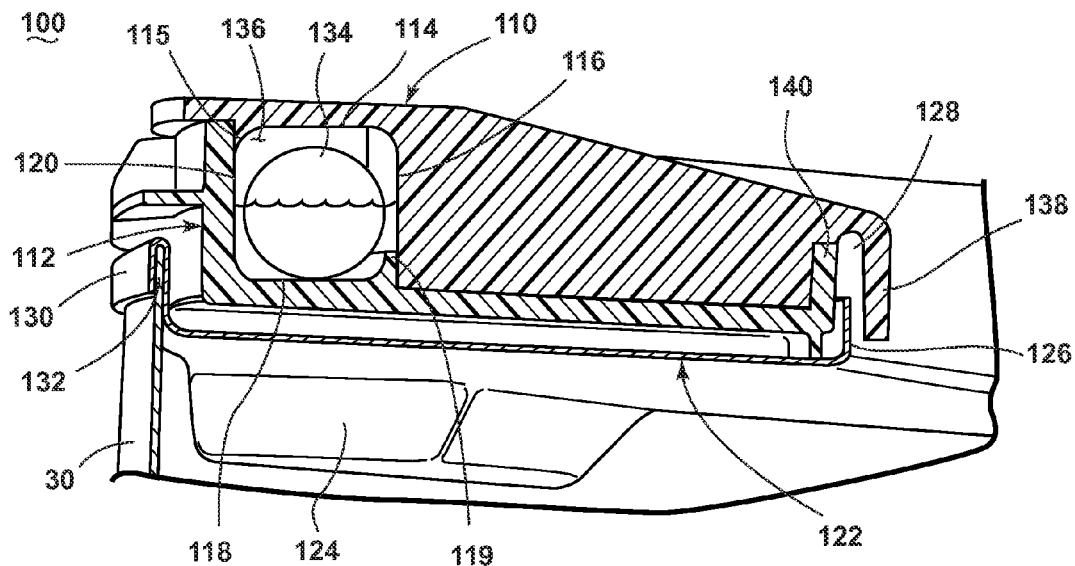
FIG. 4 is a cross section taken along line Iv-Iv of FIG. 3 and illustrating internal components and construction of the balancer of FIG. 3.

The laundry treating appliance 10 may also include a dynamic balancer device 100 coupled with a front and/or rear end of the drum 16 to offset an imbalance that may occur in the treating chamber 18 during rotation of the drum 16 during a cycle of operation. FIG. 3 illustrates a view of the dynamic balancer device 100 and shows that the device can be an annular ring. Looking again also at FIG. 1, the dynamic balancer device 100 is adapted to be mounted coaxially with a longitudinal axis of the treating chamber 18. As shown, the dynamic balancer device 100 may be coupled with the drum 16 by screws placed through the drum 16 and a set of aligning channels 124 provided in an annular piece 112. Alternatively, or in parallel, as shown in FIG. 4, an annular flange 130 may be provided on a support ring 122, which mates with a terminal edge 132 of a wall 30 of the rotatable drum 16 to provide a support for the dynamic balancer device 100. Coupling the dynamic balancer device 100 to the drum 16, either directly or via the support ring 122, may be provided using any suitable mechanical and/or non-mechanical fastening means, non-limiting examples of which include spring-clips, screws, adhesives, and a tongue and groove connection.

FIG. 4 also illustrates a cross section of the dynamic balancer device 100 in one embodiment. The dynamic balancer device 100 includes a first ring-like raceway piece 110 and a second ring-like raceway piece 112, each having an L-shaped cross section. The L-shaped cross section of the first raceway piece 110 defines an annular channel 111 that is formed by a top wall 114 and an inner side wall 116 and is generally located near the outer radial edge of the first raceway piece 110. Similarly, the second raceway piece 112 has an L-shaped cross section defining an annular channel 113 formed by a bottom wall 118 and an outer side wall 120 and is generally located near the outer radial edge of the second raceway piece 112. Note that the descriptors "top", "inner side", "outer side", and "bottom" are relative to the perspective of FIG. 4, and do not necessarily reflect the actual positioning of the dynamic balancer device 100 or a washing machine in which it may be installed during use. The first raceway piece 110 is attached to the second raceway piece 112 such that their respective annular channels 111, 113 are facing one another.

In this way, each of the first and second raceway pieces 110, 112 are attached to each other in abutting relationship so that the annular channels 111, 113 form an annular raceway 136 in which a movable mass 134 may be disposed. Although the first and second raceway pieces 110, 112 are described herein as ring-like, it will be understood that they need not be perfectly annular or round, and in some embodiments instead may have irregularities, discontinuities, appendages, or gaps (not shown) provided that nothing in the structure of the annular raceway 136 will substantially restrict movement of the movable mass 134 therein.

In one embodiment of the invention, to engage the opposing L-shaped cross sections of the first and second raceway pieces 110, 112, an abutment 115 may be disposed on the top wall 114 of the first raceway piece 110 to provide a surface for the outer side wall 120 of the second raceway piece 112 to contact the top wall 114 of the first piece 110. A second abutment 119 may be provided on the bottom wall 118 of the second raceway piece 112 to similarly provide a surface for contact between the bottom wall 118 of the second piece 112 and the inner side wall 116 of the first raceway piece 110. Each of the abutments 115, 119 may be extended concentrically with the dynamic balancer device 100 along the respective first and second raceway pieces 110, 112 on which they are provided.

The first raceway piece 110 may include an inner radial edge with a downward projected flange 138 that forms a recessed axial slot 128. The second raceway piece 112 may include an inner radial edge with a flange 140 projecting upward therefrom. The dynamic balancer device 100 may be assembled by generally inserting the flange 140 of the second raceway piece 112 into the recessed axial slot 128 thereby effecting a snap fit engagement between the first and second raceway pieces 110, 112. In this way, the abutments 115, 119 oppose the outer side wall 120 and the inner side wall 116, respectively, while the flange 140 opposes radially inward movement of the first raceway piece 110; thereby rigidly enclosing the annular raceway 136.

The mass 134 movable along the raceway may include a fluid, such as water, salt water, oil or other viscous fluid, for example, and optionally one or more moveable weights, such as spherical balls. The mass 134 may partially fill the chamber and may distribute or collect unevenly to offset an unbalanced condition in the rotatable drum 16.

The rotatable drum 16 may further include the support ring 122 to facilitate attachment of the dynamic balancer device 100 to the rotatable drum 16. The support ring 122 may be a rigid annular ring provided with aligning channels 124, and configured to receive the second raceway piece 112 in a nested configuration. The inner radial edge of the support ring 122 may have an axially extending flange 126 and the outer edge of the support ring 122 may have a slot in the flange 130, sized to receive the terminal edge 132 of the drum wall 30. When the dynamic balancer device 100 is assembled to the drum 16, the axially extending flange 126 may be covered by the downward projected flange 138 to deter contact between articles of a laundry load and sharp edges or burrs that may be disposed on the flange 126 of the support ring 122. As well, an outer surface of the second raceway piece 112 may be disposed adjacent the annular flange 130 and secured thereto as discussed above.

Figure 5:
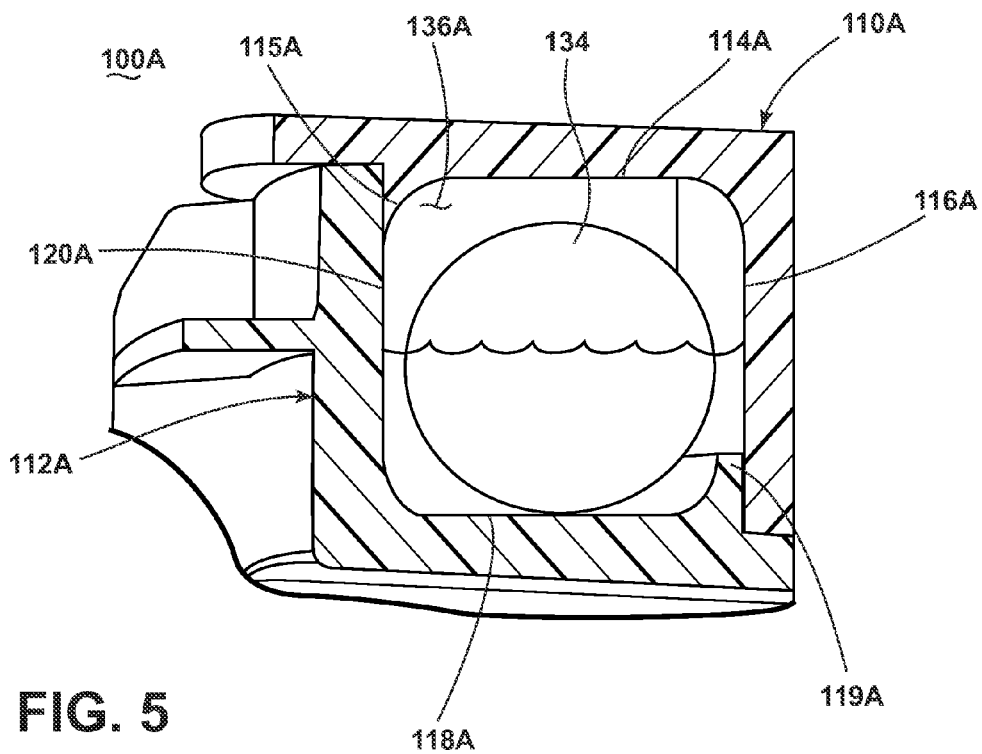
FIG. 5 is a cross section of a balancer device in accordance with another embodiment of the invention.

Referring now to FIG. 5, an alternate embodiment of the dynamic balancer device 100 may be formed where the material that forms the inner wall 116A does not extend radially inward therefrom. The first and second raceway pieces 110A, 112A may be formed so that the facing relationship of the L-shaped combination of the two raceway pieces will form the annular raceway 136. Neither of the first and second raceway pieces 110A, 112A includes additional material to extend inward beyond what is needed to mate the raceway pieces 110A, 112A by coupling the abutments 115A, 119A to the outer side wall 120A and the inner side wall 116A, as described above.

Figure 6:
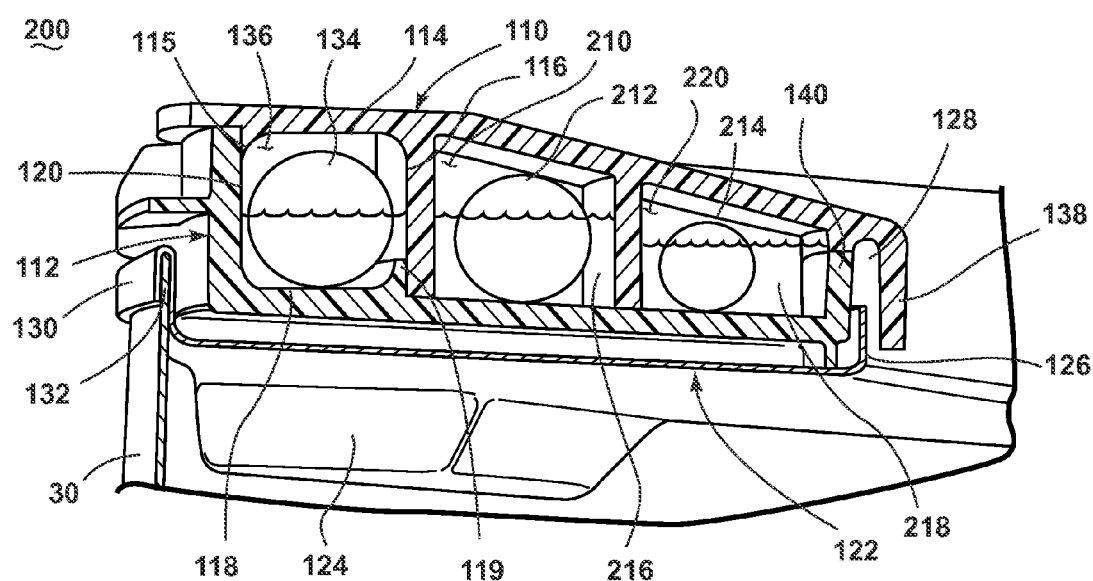
FIG. 6 is a cross section taken along line Iv-Iv of FIG. 3 and illustrating internal components and construction of the balancer of FIG. 3 with multiple chambers.

Referring now to FIG. 6, a dynamic balancer device 200 may include additional annular raceways 210, 220 that may be partially filled with a mass that may include a fluid 216, 218, such as water, salt water, oil or other viscous fluid, for example, and optionally, one or more moveable weights such as spherical balls 212, 214. The first raceway piece 110 may include at least one additional raceway disposed radially interior to the annular raceway 136. While shown in FIG. 6 with two interior raceways, the number of interior raceways may be more or less depending upon the implementation. Additionally, the type of mass contained in each raceway may be different. For example, while the outer annular raceway 136 may contain a movable mass in the form of spherical balls 134, the interior annular raceways 210, 220 may contain only liquid 216, 218. Other combinations are contemplated and may include all raceways containing the same type of mass or each raceway containing different types of mass. Additionally, the inner raceways 210, 220 may not extend annularly uninhibited. Instead, the inner raceways 210, 220 may be segmented such that cross sections of the first raceway piece 110 alternate radially between what is shown in FIG. 3 and FIG. 4.

Each of the first and second raceway pieces 110, 112 is preferably made from an injection molded plastic material, but could be made from steel or aluminum. Other suitable materials for forming the first and second raceway pieces 110, 112 are contemplated and may include plastics, metals, alloys etc. The optional support ring 122 is preferably made from metal such as steel or aluminum.

The first and second raceway pieces 110, 112 may be coupled by the snap fit or tongue and groove connections described above. Alternatively, or in addition to, the described connections, welding processes and/or adhesives may be used to reinforce the connections between the components of the dynamic balancer device 100 or to connect the dynamic balancer device 100 to the drum 16. For best results, connections between the first and second raceway pieces 110, 112, should be adhered to form a fluid tight seal when the mass disposed in the one or more raceways is liquid.

It will be understood that more than one dynamic balancer device 100, 200 may be disposed in a laundry treating device. For example, in a horizontal axis washing machine, there may be a dynamic balancer device 100 at both the front and rear ends of the rotatable drum 16. As well, each dynamic balancer device may be different, as for example, the dynamic balancer device 100 with a single raceway on one end and a hybrid balancer device 200 with multiple raceways on the other end.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A dynamic balancer device for a laundry treating appliance including a rotatable drum for receiving a laundry load comprising:

a first raceway piece having an L-shaped cross section formed by two walls defining a first annular channel wherein one of the two walls has a first abutment extending laterally therefrom, a second raceway piece having an L-shaped cross section formed by two walls defining a second annular channel wherein one of the two walls has a second abutment extending laterally therefrom, wherein the first raceway piece is attached to the second raceway piece so that first and second raceway pieces do not move relative to each other, with the first annular channel facing the second annular channel to define an annular raceway and with the first abutment engaging a wall of the second raceway piece and the second abutment engaging a wall of the first raceway piece with each of the first and second annular channels respectively defining two walls of the annular raceway, and the first and second abutments extending inwardly of the annular raceway, and a mass disposed in the annular raceway and movable therein.

2. The dynamic balancer of claim 1 wherein the first and second raceway pieces are each formed of one of plastic, steel, or aluminum.

3. The dynamic balancer of claim 1 wherein the first and second raceway pieces are attached by snap fit engagement.

4. The dynamic balancer of claim 1 wherein the second annular channel defines an outer wall of the raceway which is configured to abut a wall of the rotatable drum.

5. The dynamic balancer of claim 1 wherein the mass includes at least one of balls, viscous fluid, or water.

6. The dynamic balancer of claim 1 further comprising at least one other annular raceway disposed radially interior to the annular raceway.

7. The dynamic balancer of claim 6 wherein the mass disposed in the annular raceway is of a first type and a second mass disposed in the at least one other interior raceway and movable therein is of a second type different from the first type.

8. The dynamic balancer of claim 1 wherein the second raceway piece is configured to be received in nested relationship in a support ring secured to the rotatable drum.

9. The dynamic balancer of claim 8 wherein the support ring is formed of metal.

10. The dynamic balancer of claim 8 wherein the support ring includes a plurality of aligning channels to align the second raceway piece in nested relationship.

11. The dynamic balancer of claim 8 wherein the support ring has an interior axially extending flange and the first raceway piece has an axial slot that covers the axially extending flange.

12. A laundry treating appliance comprising:

a rotatable drum for receiving a laundry load wherein the rotatable drum has an annular wall at one end thereof, and a dynamic balancer device disposed adjacent to the annular wall and including a first raceway piece having an L-shaped cross section formed by two walls defining a first annular channel wherein one of the two walls has a first abutment extending laterally therefrom, a second raceway piece having an L-shaped cross section formed by two walls defining a second annular channel, wherein one of the two walls has a second abutment extending laterally therefrom, wherein the first raceway piece is attached to the second raceway piece so that first and second raceway pieces do not move relative to each other, with the first annular channel facing the second annular channel to define an annular raceway and with the first abutment engaging a wall of the second raceway piece and the second abutment engaging a wall of the first raceway piece with each of the first and second annular channels respectively defining two walls of the annular raceway, and the first and second abutments extending inwardly of the annular raceway, and a mass disposed in the raceway and movable therein.

13. The laundry treating appliance of claim 12 wherein the rotatable drum is disposed on one of a horizontal or a vertical axis.

14. The laundry treating appliance of claim 12 wherein the second annular channel defines an outer wall of the raceway which is configured to abut an annular wall of the rotatable drum.

15. The laundry treating appliance of claim 12 wherein the mass includes at least one of balls, viscous fluid, or water.

16. The laundry treating appliance of claim 12 wherein the dynamic balancer device includes at least one other annular raceway disposed radially interior to the annular raceway.

17. The laundry treating appliance of claim 16 wherein the mass disposed in the annular raceway is of a first type and a second mass disposed in the at least one other raceway is of a second type different from the first type.

18. The laundry treating appliance of claim 12 further comprising a support ring for secure attachment to the rotatable drum and configured to receive the second raceway piece in nested relationship.

19. The dynamic balancer of claim 18 wherein the support ring is formed of metal.

20. The dynamic balancer of claim 18 wherein the support ring includes a plurality of aligning channels to align the second raceway piece in nested relationship.

* * * * *